(12) United States Patent
Goebel et al.

(10) Patent No.: US 8,600,438 B2
(45) Date of Patent: *Dec. 3, 2013

(54) MOBILE TELEPHONE WITH CAMERA

(75) Inventors: Klaus Goebel, Munich (DE);
Hans-Peter Hockenreiner, Germering (DE)

(73) Assignee: Palm, Inc., Sunnyvale, CA (US)

( * ) Notice: Subject to any disclaimer, the term of this patent is extended or adjusted under 35 U.S.C. 154(b) by 1383 days.

This patent is subject to a terminal disclaimer.

(21) Appl. No.: 12/099,571

(22) Filed: Apr. 8, 2008

(65) Prior Publication Data

US 2008/0188262 A1    Aug. 7, 2008

Related U.S. Application Data

(63) Continuation of application No. 10/508,102, filed as application No. PCT/EP03/09707 on Sep. 1, 2003, now Pat. No. 7,366,541.

(30) Foreign Application Priority Data

Jan. 23, 2003   (DE) .................................. 103 02 640

(51) Int. Cl.
*H04M 1/00*    (2006.01)
(52) U.S. Cl.
CPC ....................................... *H04M 1/00* (2013.01)
USPC ..................... 455/557; 455/556.1; 455/575.1; 348/14.01

(58) Field of Classification Search
USPC ............. 455/557, 556.1, 575.1, 575.3, 575.4, 455/348, 566; 348/14.01–14.09, 333.06, 348/373, 207.99, 158
See application file for complete search history.

(56) References Cited

U.S. PATENT DOCUMENTS

| 5,278,739 | A | * | 1/1994 | Gammache .................... 362/197 |
| 5,719,936 | A | * | 2/1998 | Hillenmayer .................. 379/447 |
| 6,473,631 | B1 | | 10/2002 | Siddoway et al. |
| 6,947,601 | B2 | * | 9/2005 | Aoki et al. ..................... 382/235 |
| 2001/0004269 | A1 | | 6/2001 | Shibata et al. |
| 2002/0051060 | A1 | | 5/2002 | Wada |
| 2003/0160861 | A1 | * | 8/2003 | Barlow et al. .............. 348/14.01 |
| 2004/0012701 | A1 | * | 1/2004 | Nagai et al. ............. 348/333.12 |
| 2004/0120552 | A1 | * | 6/2004 | Borngraber et al. .......... 382/115 |

FOREIGN PATENT DOCUMENTS

| DE | 1 320 020 A1 | 12/2001 |
| JP | 2001102825 A | 4/2001 |
| JP | 2001245267 A | 9/2001 |
| JP | 2002223275 A | 8/2002 |
| JP | 2003018261 A | 1/2003 |

* cited by examiner

*Primary Examiner* — Melur Ramakrishaiah

(57)    ABSTRACT

A mobile telephone with a camera, a casing, a display and a keypad for entering manual commands is disclosed. The camera is permanently attached to at least a part of the keypad in a subcomponent of the casing, wherein the subcomponent within a chassis of the casing is designed in such a way that it can be swiveled about at least one axis relative to the display, and the chassis at least partly surrounds the subcomponent.

13 Claims, 6 Drawing Sheets

MOBILE TELEPHONE WITH CAMERA

CLAIM FOR PRIORITY

This application is a continuation of application Ser. No. 10/508,102, filed Sep. 15, 2004, which is a national stage application of PCT/EP2003/009707, filed Sep. 1, 2003, which claims the benefit of priority to German Application No. 103 02 640.1, filed Jan. 23, 2003, the contents of which hereby incorporated by reference.

BACKGROUND

The present disclosure relates to a mobile telephone with camera, comprising at least a casing, a display and a keypad for entering manual commands.

An increasing number of mobile telephones are currently being equipped with cameras, in order that photographs can be recorded and transferred in addition to text messages and voice messages. In the case of mobile telephones with cameras, a plurality of requirements must be considered.

The camera should be attached on or in the mobile telephone in such a way that the typical device design of a mobile telephone is retained. Hence the additional camera should not increase the external dimensions of the mobile telephone, since this would adversely affect the feel and/or handling of the mobile telephone, for example. It is therefore assumed that particularly small camera modules are attached on/in mobile telephones. However, this conflicts with the desire of the end customer for high-resolution and high-quality camera modules. These high-quality camera modules normally have larger dimensions than low-quality smaller camera modules.

When equipping a mobile telephone with a camera, there is a further requirement that both recordings of the surroundings and self-portrait recordings of the mobile telephone user should be possible. In order to be able to check the correct recording field/position field of the object which is to be photographed, a "check picture" should be visible in the display of the mobile telephone. For this, the camera should be positioned rotatably in a swivel range of approximately 180 degrees.

There is also a need to protect the optical components of the camera against dirt and scratches when it is not in use.

Solutions and pointers to solutions for equipping a mobile telephone with a camera already exist. However, these previous solutions and pointers to solutions do not satisfy or only partly satisfy the above mentioned requirements. These solutions and pointers to solutions are briefly introduced below:

One possibility for providing a camera with mobile telephone consists in integrating the camera in a separate plug-on module. This plug-on module, which is generally designed to be rotatable, is coupled onto a mobile telephone as required. A disadvantage of this solution is that the camera is integrated in the plug-on module and not in the mobile telephone. As a result of increasing the overall dimensions when the plug-on module is accommodated, the handling of a mobile telephone is generally impractical and unwieldy. Therefore, for reasons of convenience, the separate plug-on module is not generally carried by the mobile telephone owner.

A further possibility consists in integrating a camera on the back of the mobile telephone, such that the camera is generally located on the opposite side to the mobile telephone display. In order to protect the camera lens from scratches, a sliding cover for the camera optics is already used in this camera integration possibility. A disadvantage of this solution is that self-portrait recordings of the mobile telephone user are only possible without provision for checking the camera recordings in the display of the mobile telephone.

An improvement to the "integration of a camera on the back of the mobile telephone" would be the integration of two cameras on the front and the back of the mobile telephone respectively. This solution has the advantage that it allows both recordings of the surroundings and self-portrait recordings of the mobile telephone user, wherein the mobile telephone user can see the camera recordings in the display of the mobile telephone. Firstly the increased space required for two camera modules, and secondly the increased cost factor of the "double" number of camera modules, have a disadvantageous effect. Moreover, the integration of two cameras in the mobile telephone means that costs relating to the protective mechanism for the camera optics will be doubled.

A further known camera integration possibility is used in mobile telephones consisting of two halves which can be pushed together. In this case, the camera is integrated in one half. In the closed state, the camera is protected between the halves against scratching of the optical parts. In this solution, self-portrait recordings of the mobile telephone user are again only possible without provision for checking the camera recordings in the display of the mobile telephone. Furthermore, the thickness of the mobile telephone is particularly great in this camera integration possibility, thereby making the mobile telephone unwieldy.

A good solution for camera integration is currently implemented in mobile telephones of the "clamshell design". In this case, the camera is rotatably integrated into the hinged joint of the two "mobile telephone halves". This mobile telephone allows recordings of the surroundings as well as self-portrait recordings with concurrent viewing of the mobile telephone display. The disadvantage of this solution is that only very small camera modules and therefore low-quality camera modules can be used, since the diameter of the hinged joint otherwise becomes unacceptably large.

SUMMARY

The disclosed mobile telephone in which a high-resolution and high-quality camera is integrated in the mobile telephone in such a way that the typical device design of a mobile telephone is retained and both recordings of the surroundings and self-portrait recordings of the mobile telephone user are made possible, wherein the camera recordings can be viewed in the display of the mobile telephone by the mobile telephone user and the camera optics are protected against dirt and scratches when the camera function is not in use.

The inventors have recognized that, even in mobile telephones which are not constructed according to the "clamshell design", a new swivel mechanism allows the integration into the mobile telephone of a high-resolution and therefore generally larger camera than the cameras which were previously used in clamshell mobile telephones, without changing the typical device design of a mobile telephone. Moreover, this allows both recordings of the surroundings and self-portrait recordings of the mobile telephone user, wherein the camera recordings can be viewed in the display of the mobile telephone.

This disclosure proposes to improve a mobile telephone with camera, comprising at least a casing, a display and a keypad for entering manual commands, to the effect that the camera is permanently attached to at least a part of the keypad in a subcomponent of the casing, wherein the subcomponent within a chassis of the casing is designed in such a way that it can be swiveled about at least one axis relative to the display, and the chassis at least partly surrounds the subcomponent.

This embodiment of the mobile telephone has the following features. Firstly, by positioning the subcomponent in such a way that the camera is preferably arranged between the chassis and the casing, any action of dirt on the camera optics is prevented. Secondly, the swivelable design of the subcomponent extends the scanning range of the camera while the mobile telephone display can simultaneously be used as a checking screen.

It is beneficial having the mobile telephone featuring a subcomponent that can be swiveled in an angle range of up to 90 degrees, preferably in an angle range of up to 180 degrees, in one swivel direction and in the opposite axial swivel direction. This allows recordings to be made at different angles, and the display or the camera to be adapted to the needs of the mobile telephone user The subcomponent should be designed in such a way that it can be swiveled about an axis that is oriented parallel or perpendicular to the longitudinal axis of the mobile telephone. This makes it particularly easy to orient the display on the horizontal or the vertical plane.

Alternatively, the subcomponent may be designed in such a way that it can be swiveled about an axis which runs diagonal to the longitudinal axis of the mobile telephone, preferably about an axis which runs at 45 degrees to the longitudinal axis. In particular, if the subcomponent then additionally has a rectangular cross-section, the advantage is derived that two sides of the rectangle are available as surfaces for the fitting of camera optics and flashlight.

In order to increase the user friendliness of the different mobile telephone functions such as telephoning or photographing, the subcomponent may be designed in such a way that it can be engaged in at least three positions. By means of this engagement, it is ensured that the subcomponent is held in a desired position and is not inadvertently rotated while the user executes a mobile telephone function. It is entirely possible for a plurality of "intermediate engagement positions" to be present between these three engagement positions.

In a first engagement position, the lens of the camera should be oriented in such a way that the user of the mobile telephone can scan an object from the surroundings via the lens of the camera, and simultaneously see this object in the display of the mobile telephone. Display and camera lens are therefore oriented on opposite sides of the mobile telephone.

The second engagement position should be settable in such a way that the orientation of the subcomponent in relation to the display of the mobile telephone allows a self-scan of the user by the user, via the lens of the camera, wherein the user can simultaneously see the self-portrait in the display.

In the third engagement position, the lens of the camera is located between the chassis of the mobile telephone casing and the subcomponent. This engagement position is designed for conventional telephoning. The keypad of the mobile telephone is accessible in this engagement position.

At least one slidable and/or swivelable protective panel can be arranged on the subcomponent, in order to protect the camera lens against damage. This element can be protected against dirt and scratches, therefore, even in the engagement positions one and two when the camera lens is not arranged between the subcomponent and the chassis of the casing.

The subcomponent of the casing should be designed in such a way that it can be removed from the remainder of the casing of the mobile telephone. The camera of the mobile telephone is integrated in the subcomponent. By virtue of this removable design, the camera can be used independently of the remainder of the mobile telephone. Due to the compact external dimensions of the subcomponent, whose sides are only few centimeters in length, the subcomponent containing the camera can be concealed in rooms and used for monitoring said rooms and then photographically capturing one or more room recordings.

Both the subcomponent and the remaining casing of the mobile telephone should each have a power supply. It is thus possible to ensure that, for example, if the camera function is temporarily unavailable as a result of an empty battery due to taking a multiplicity of photographs, the mobile telephone can still be used for the purpose of telephony.

It is beneficial if the subcomponent and the remaining casing of the mobile telephone each has an interface, preferably a radio connection interface such as Bluetooth, for example, via which the two parts intercommunicate. It is thus possible for the part component containing the camera module to exchange data, e.g. picture data, with the remaining mobile telephone, even over specified distances.

The present disclosure is described in greater detail below with reference to disclosed embodiments and to the FIGS. 1 to 12, wherein the following abbreviations are used in the FIGS: 1: mobile telephone; 2: loudspeaker; 3: camera button; 4: display of the mobile telephone; 4.1: swivelable display; 5: keypad for menu input; 5.1: key of the menu input keypad; 6: keypad for numeric/alphabetic input; 6.1: key of the numeric/alphabetic input pad; 7: microphone; 8: casing of the mobile telephone; 8.1: swivelable subcomponent of the casing; 8.1.1: engagement position "one" of the subcomponent; 8.1.2: engagement position "two" of the subcomponent; 8.1.3: engagement position "three" of the subcomponent; 8.2: removable and swivelable subcomponent of the casing; 8.3 chassis of the casing 8, which surrounds the subcomponents 8.1 and 8.2; 9.1: swivel axis running parallel to the longitudinal axis of the mobile telephone; 9.2: swivel axis running perpendicular to the longitudinal axis of the mobile telephone; 9.3: swivel axis running diagonal to the longitudinal axis of the mobile telephone; 10: camera lens; 11: flashlight; 12: distance sensor; 13: slot for SIM card (SIM=Subscriber Identify Module); 14: plug socket for interface; 15: protective panel for camera lens; 16: interface.

DETAILED DESCRIPTION

Figure 1:
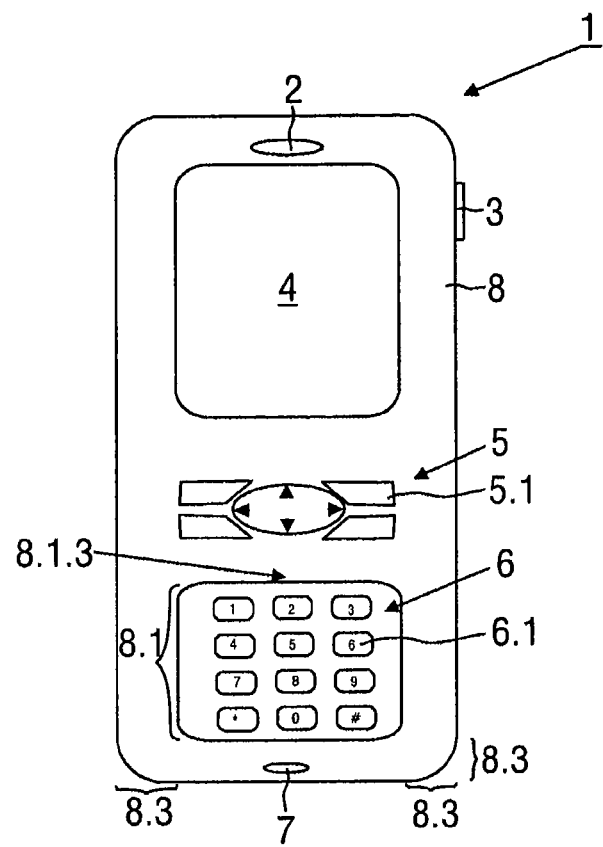
FIG. 1 illustrates a mobile telephone in a plan view of the display and the keypad.

FIG. 1 shows a view of the operating surface of a novel mobile telephone 1 with camera. The camera of the mobile telephone 1 is not visible in this view. Only the camera button 3 on the top right-hand side of the casing 8 of the mobile telephone 1 indicates the presence of the camera. In much the same way as known mobile telephones 1, this "camera phone" has a loudspeaker 2 at the upper edge area of the casing 8 and a microphone 7 at the lower edge area, for outputting and inputting acoustic signals including voice signals. The upper half of the casing 8 contains a display 4, in which functional operations of the mobile telephone 1 can be viewed optically, e.g. incoming call and menu overview of the mobile telephone 1. This display 4 can be a color TFT display, for example. In the center part of the casing 8 of the mobile telephone 1 is the keypad 5 for menu input using the keys 5.1. The keys 5.1 of the menu input keypad make it possible to switch between the menus of the mobile telephone 1. In the lower part of the casing 8 are the keys 6.1 on the keypad 6 for numeric/alphabetic input, said keys allowing the selection or depression of the numbers 0 to 9 and the letters a to z. The keys 6.1 can be used to press the selection digits when making a telephone connection, for example, or to enter the letters when writing a text message (commonly abbreviated as SMS).

The particularity of this mobile telephone 1 is that a subcomponent 8.1 of the casing 8 of the mobile telephone 1 is designed to be swivelable within a chassis 8.3. The camera is integrated in this subcomponent 8.1. The keypad 6 for numeric/alphabetic input is also integrated in this swivelable subcomponent 8.1. In this illustration, the subcomponent 8.1 is in the engagement position "three" 8.1.3, which means that the camera of the mobile telephone 1 is protected between subcomponent 8.1 and casing 8 of the mobile telephone 1. In the engagement position "three" 8.1.3, the mobile telephone can be used according to its functionality for telephoning or exchanging text messages.

In order to be able to record photographs using this mobile telephone 1, the camera between the subcomponent 8.1 and the chassis 8.3 of the casing 8 of the mobile telephone 1 is "opened" by swiveling the subcomponent 8.1.

Figure 2:
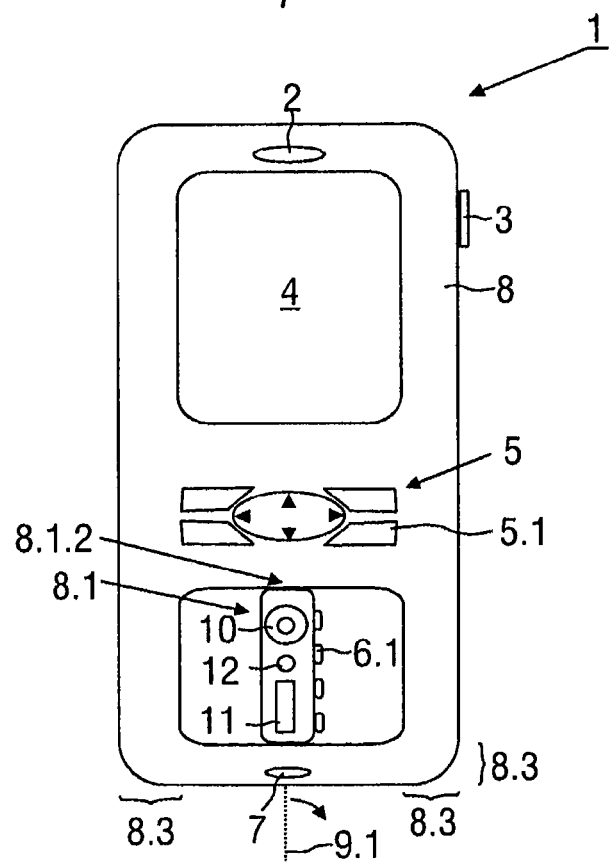
FIG. 2 illustrates a mobile telephone with swiveled subcomponent of the casing, said subcomponent having an integrated camera.

The camera lens 10 can now be seen in FIG. 2. In order to achieve this, the subcomponent 8.1 was swiveled through 90 degrees to the right about the swivel axis 9.1 which runs parallel to the longitudinal axis of the mobile telephone 1, by means of a light pressure with the fingers on the right-hand side of the keypad 6 for the numeric input. A further engagement position "three" 8.1.3 also exists in this position of the subcomponent 8.1, thereby ensuring that the camera lens 10 is not inadvertently jarred by rotation of the subcomponent 8.1 when recording pictures. The engagement position "three" 8.1.3 is suitable for the recording of self-portraits of the mobile telephone user. In this engagement position "three" 8.1.3, both the camera lens 10 and the display 4 of the mobile telephone 1 can be seen at the same time by the mobile telephone user. The subcomponent 8.1 also includes a flashlight 11 for nighttime recordings and a distance sensor 12, which measures the distance from the object to be photographed to the camera lens and then adjusts the focus of the camera lens 10 accordingly.

Figure 3:
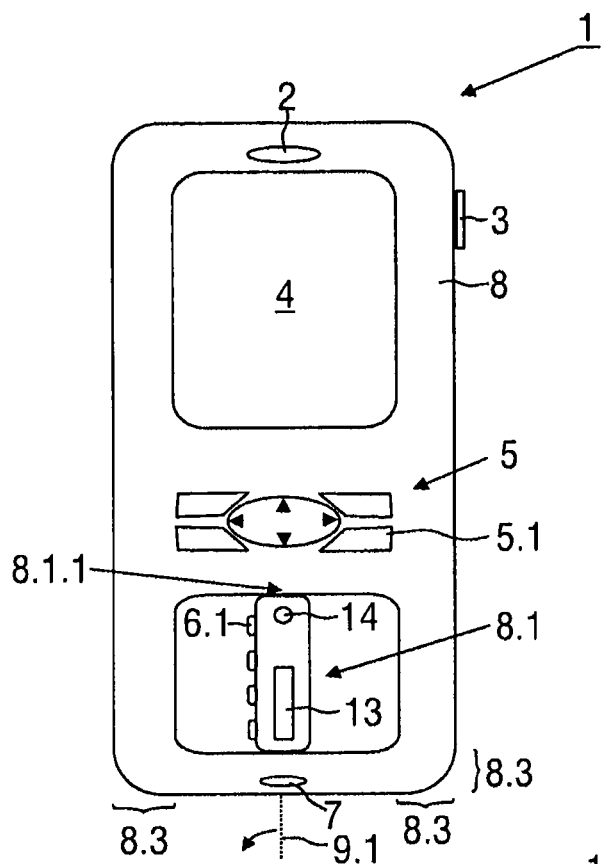
FIG. 3 illustrates a mobile telephone as shown in FIG. 2, but with the subcomponent of the casing being swiveled in the opposite direction.

FIG. 3 shows a mobile telephone 1 which allows recordings to be made of the surroundings. In order to achieve this, the subcomponent 8.1 of the mobile telephone 1 from FIG. 1 was swiveled through 90 degrees to the left about the swivel axis 9.1 which runs parallel to the longitudinal axis of the mobile telephone 1, by means of a light pressure with the fingers on the left-hand side of the keypad 6 for the numeric input. An engagement position "two" 8.1.2 also exists in this position of the subcomponent 8.1. This engagement position "two" 8.1.2 is suitable for recording photographs of the surroundings. In this engagement position of the subcomponent 8.1, the camera lens is arranged on the opposite side of the display 4. A picture can be photographed by pressing the camera button 3. The slot 13 for the SEM card and the plug socket 14 for the interface, which are opposite the camera lens, are visible in this view.

Figure 4:
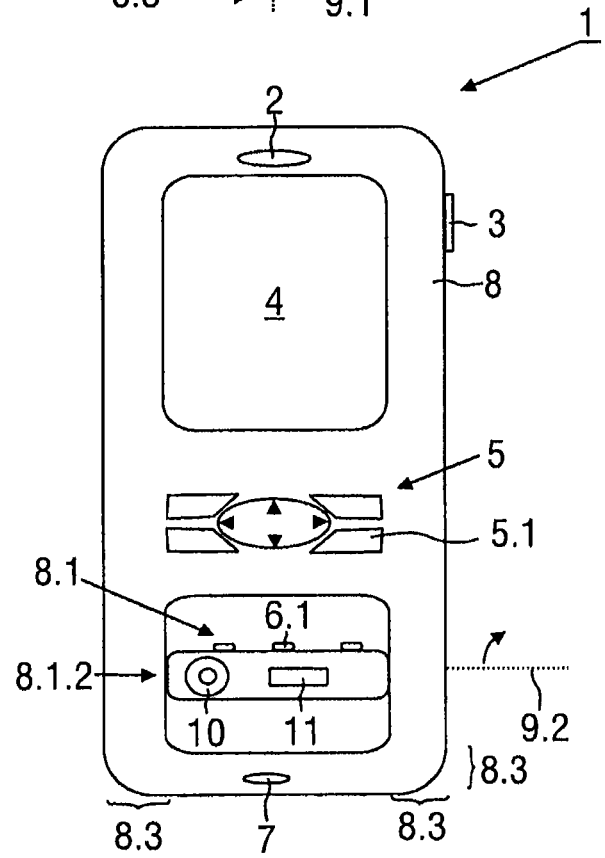
FIG. 4 illustrates a mobile telephone including subcomponent with integrated camera, said subcomponent being swivelable perpendicular to the longitudinal axis of the mobile telephone.
Figure 5:
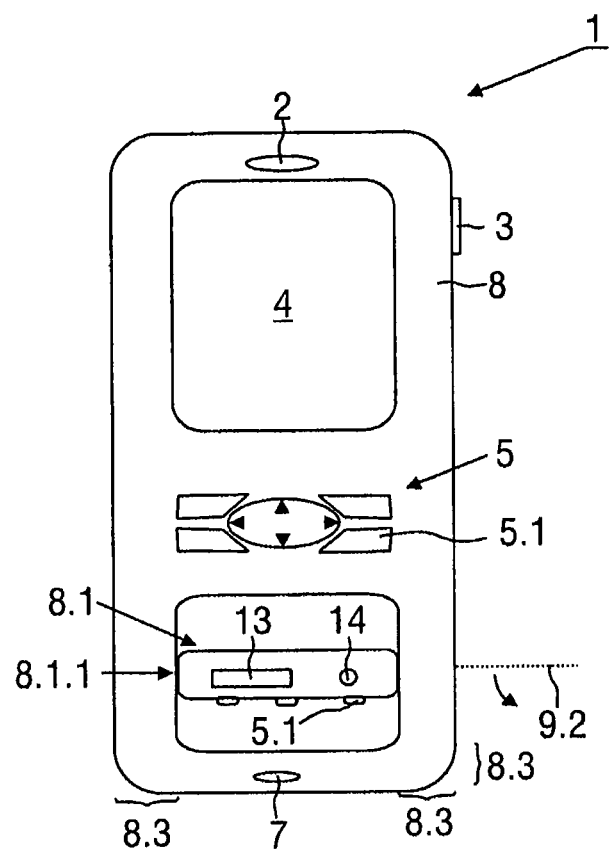
FIG. 5 illustrates a mobile telephone as shown in FIG. 4, but with the subcomponent of the casing being swiveled in the opposite direction.

FIGS. 4 and 5 show a further embodiment of the novel mobile telephone 1 in different engagement positions of the subcomponent 8.1. Differing from the FIGS. 1 to 3, the subcomponent 8.1 is now swivelable about an axis 9.2 which runs perpendicular to the longitudinal axis of the mobile telephone 1. In FIG. 4, the subcomponent 8.1 is illustrated in the engagement position "two" 8.1.2, which is suitable for making self-portrait recordings of the mobile telephone user. The display 4 and the camera lens 10 are visible on the same side of the casing 8. In FIG. 5, the subcomponent 8.1 is rotated through 180 degrees in comparison with the illustration in FIG. 4.

Figure 6:
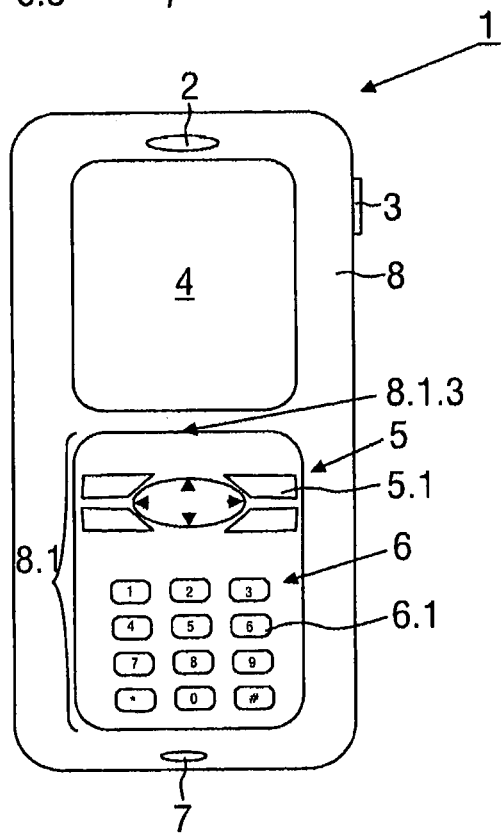
FIG. 6 illustrates a mobile telephone in a plan view of the display and the keypad, wherein all keys are integrated in the subcomponent.
Figure 7:
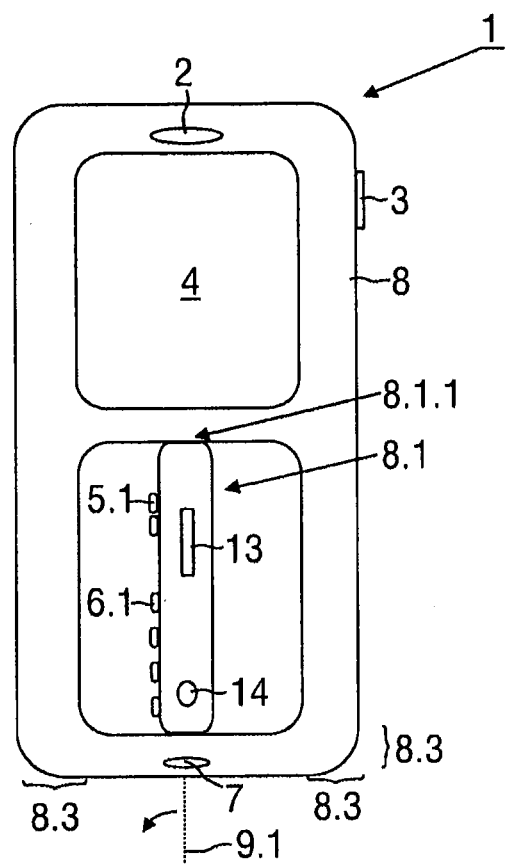
FIG. 7 illustrates a mobile telephone as shown in FIG. 6, with the subcomponent being swiveled to the left.
Figure 8:
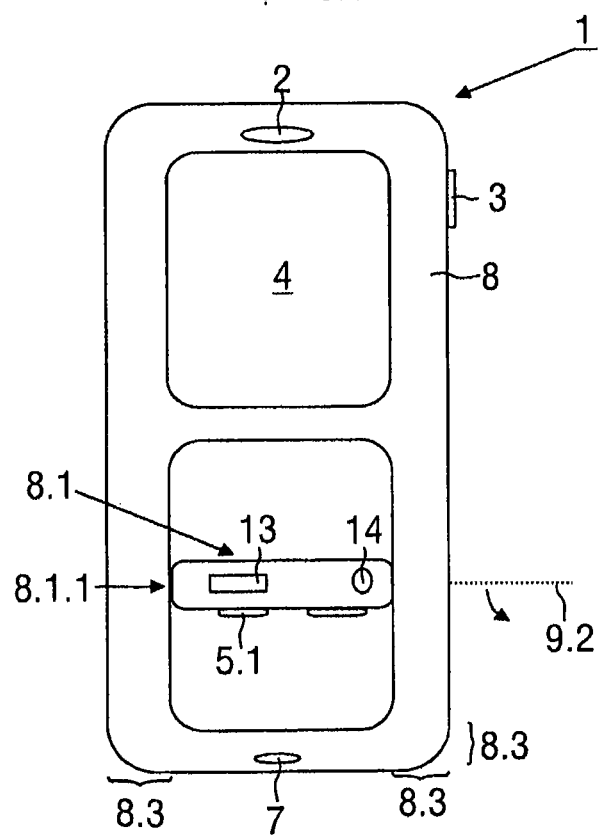
FIG. 8 illustrates a mobile telephone as shown in FIG. 6, but with the subcomponent being swiveled perpendicular to the longitudinal axis of the mobile telephone.

FIGS. 6 to 8 show a further embodiment of the novel mobile telephone 1 in different engagement positions of the subcomponent 8.1. In this embodiment, the design of the swivelable subcomponent 8.1 is larger than in FIGS. 1 to 5, such that both the keypad 5 for menu input and the keypad 6 for numeric/alphabetic input, together with the camera and the camera lens, the flashlight, the distance sensor 12, the slot 13 for the SIM card and the plug socket for the interface 14 are integrated in the subcomponent 8.1.

In FIG. 6, the subcomponent 8.1 is in the engagement position "three" 8.1.3, in which the mobile telephone can be used according to its functionality for telephoning or exchanging text messages.

In FIGS. 7 and 8, the subcomponent 8.1 in each case is illustrated in the engagement position "one" 8.1.1, wherein the subcomponent 8.1 is designed to be swivelable about an axis 9.1 in FIG. 7 and about an axis 9.2 in FIG. 8.

Figure 9:
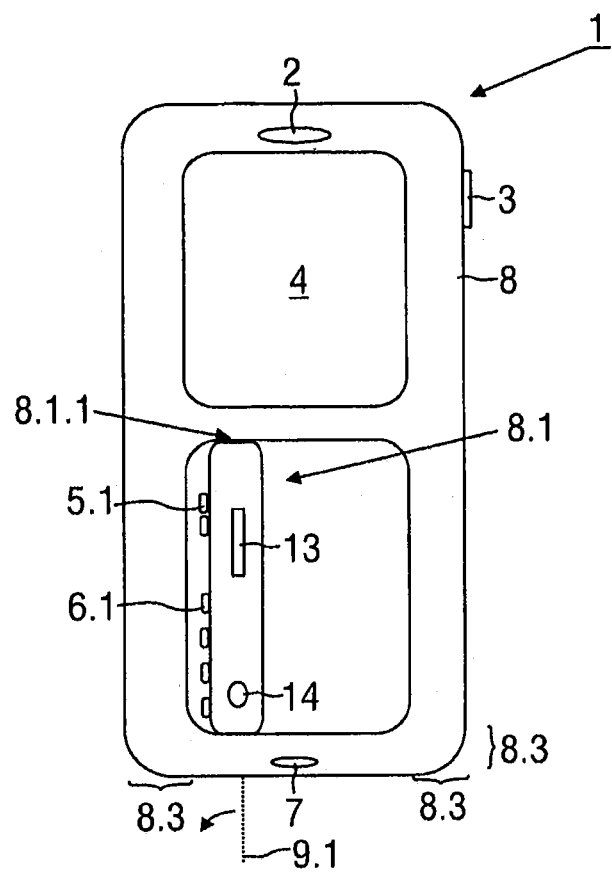
FIG. 9 illustrates a mobile telephone as shown in FIG. 7, with the swivel axis of the subcomponent being laterally offset.
Figure 10:
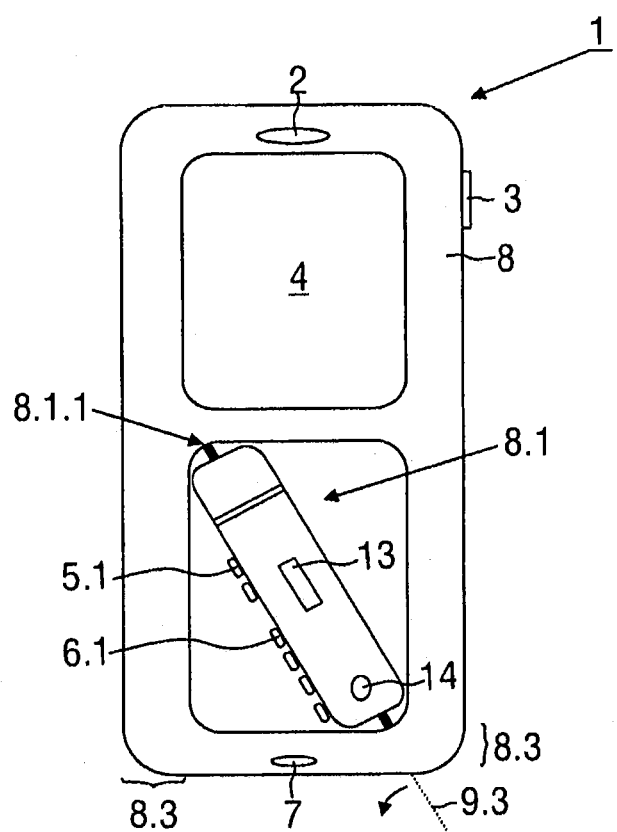
FIG. 10 illustrates a mobile telephone including subcomponent whose swivel axis runs diagonally.

Two further variants of the configuration of the swivelable subcomponent 8.1 are illustrated in the FIGS. 9 and 10. In FIG. 9, the subcomponent 8.1 is swivelable about an axis 9.1 which runs parallel to the longitudinal axis of the mobile telephone 1, but is offset to the left relative to the center axis. In FIG. 10, the axis 9.3, about which the subcomponent is designed to swivel, runs diagonal to the longitudinal axis of the mobile telephone 1. Both embodiments have the advantage that, as a result of the increased leverage which derives from the greater distance between the center of pressure for locking/unlocking the subcomponent 8.1 and the center of rotation, a movement of the subcomponent 8.1 between the engagement positions (8.1.1 to 8.1.3) requires less force.

Figure 11:
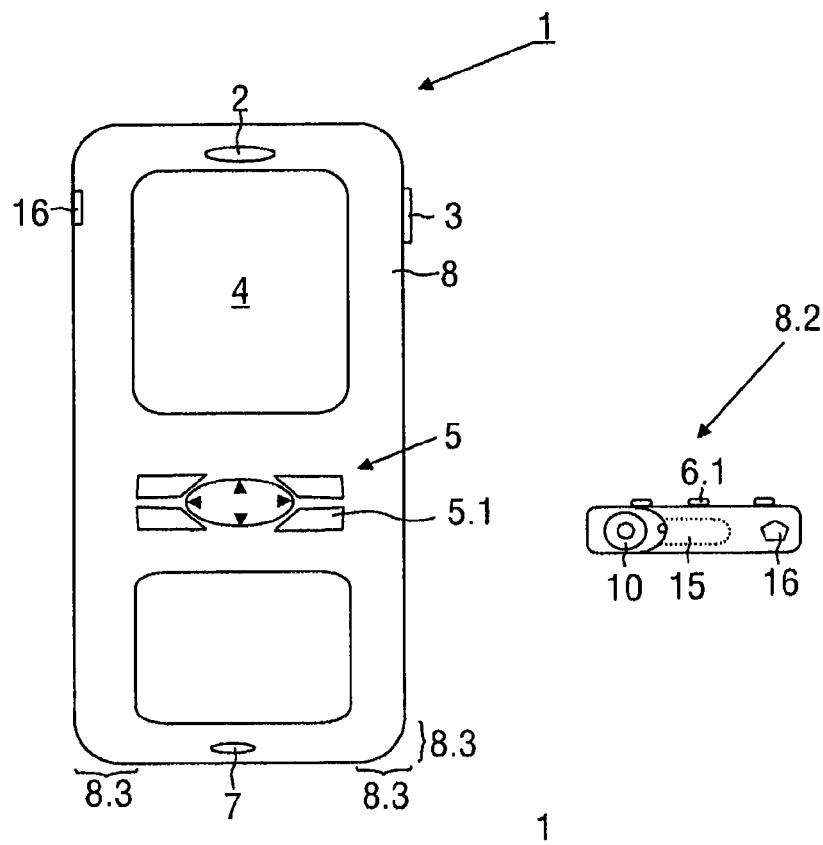
FIG. 11 illustrates a mobile telephone including subcomponent which is removable from casing.

FIG. 11 shows a further special embodiment of the novel mobile telephone 1. In this embodiment, the subcomponent 8.2 on the right-hand side in FIG. 11 is designed to be removable from the casing 8 of the mobile telephone 1. It is therefore possible to locate the removable subcomponent 8.2 separately from the casing 8. The camera which is integrated in the compact and small subcomponent 8.2 can therefore be located in a concealed manner, such that it is not apparent that a photographic recording is in progress. This is possible because the casing 8 of the "remaining" mobile telephone 1, which includes the actual camera button 3 for "triggering" the camera, and the user of the camera button 3 do not have to be in the vicinity of the camera. Interfaces 16 which are attached to the subcomponent 8.2 and to the casing 8 of the mobile telephone 1 allow the exchange of data or communication between the removable subcomponent 8.2 and the casing 8 of the "remaining" mobile telephone 1. In order to supply current to the separate elements of the mobile telephone 1, the subcomponent 8.2 and the casing 8 each have a dedicated power supply, e.g. in the form of a lithium-ion battery. In order to protect the camera lens 10 from dirt and scratches, a protective panel 15 is also attached to the subcomponent 8.2 in this embodiment, wherein said protective panel can be slid in front of the camera lens 10 when the camera is not in use.

Figure 12:
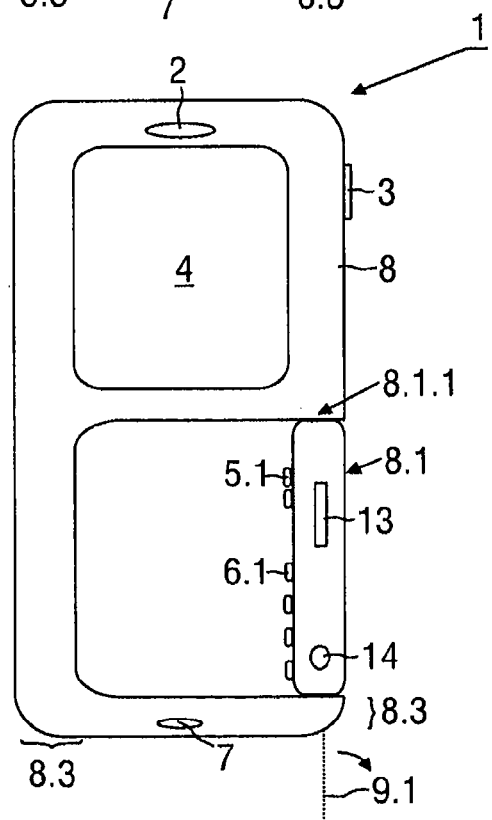
FIG. 12 illustrates a mobile telephone in which the chassis only partly surrounds the subcomponent.

FIG. 12 shows an embodiment of a novel mobile telephone 1 in which the subcomponent 8.1 is only partly surrounded by the chassis 8.3 of the casing 1.

In summary, therefore, the present disclosure provides a mobile telephone with integrated camera, wherein a high-quality camera is integrated in the mobile telephone such that the typical device design of a mobile telephone is retained and, moreover, both recordings of the surroundings and self-portrait recordings of the mobile telephone user are possible, wherein the camera recordings can be viewed by the user in the display of the mobile telephone, and furthermore the camera lens is protected against dirt and scratches when the camera function is not in use.

It is understood that the above-mentioned features of the present disclosure are not only applicable in the specified combination concerned, but also in other combinations or in isolation, without departing from the scope of the present disclosure.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A mobile electronic device comprising:
   a casing;
   a display; and
   a removable subcomponent of the casing, the removable subcomponent including a camera, the removable subcomponent located within a chassis of the casing and configured such that it can be swiveled about at least one axis relative to the display, the chassis partially surrounding the removable subcomponent.

2. The mobile electronic device as defined in claim 1, wherein the subcomponent is configured to swivel through an angle range of up to 90 degrees in one swivel direction and in an opposite axial swivel direction, respectively, for an angle range of up to 180 degrees.

3. The mobile electronic device as defined in claim 1, wherein the subcomponent is configured to swivel about an axis that is oriented one of parallel or perpendicular to a longitudinal axis of the mobile electronic device.

4. The mobile electronic device as defined in claim 1, wherein the subcomponent is configured to swivel about an axis that runs diagonal to the longitudinal axis of the mobile electronic device.

5. The mobile electronic device as defined in claim 4, wherein the axis runs at 45 degrees to the longitudinal axis.

6. The mobile electronic device as defined in claim 1, wherein the subcomponent is configured to engage in at least three positions.

7. The mobile electronic device as defined in claim 6, wherein in a first engagement position of the at least three positions, a lens of the camera is oriented in such a way that a user of the mobile electronic device can scan an object from the surroundings via the lens of the camera, and the object is simultaneously displayed by the display of the mobile electronic device.

8. The mobile electronic device as defined in claim 6, wherein in a second engagement position of the at least three positions, the lens of the camera is oriented in such a way as to allow a self-scan of a user by the user via the lens of the camera, wherein a self-portrait of the user is simultaneously displayed by the display of the mobile electronic device.

9. The mobile electronic device as defined in claim 6, wherein in a third engagement position of the at least three positions, the lens of the camera is located between the chassis of the mobile and the subcomponent.

10. The mobile electronic device as defined in claim 1, wherein at least one slidable and/or swivelable protective panel is arranged on the subcomponent in order to protect a lens of the camera against damage.

11. The mobile electronic device as defined in claim 1 wherein both the subcomponent and the remaining casing of the mobile electronic device have a power supply.

12. The mobile electronic device as defined in claim 1 wherein the subcomponent and the remaining casing of the mobile electronic device each have an a radio connection interface.

13. The mobile electronic device as defined in claim 12, wherein the radio connection interface is a Bluetooth interface via which the subcomponent and the remaining casing intercommunicate.

* * * * *